United States Patent [19]

Henning

[11] Patent Number: 5,538,313

[45] Date of Patent: Jul. 23, 1996

[54] FLATBED TRAILER TARP SYSTEM AFFORDING FRONT AND/OR REAR LOADING

[75] Inventor: Steven A. Henning, Anderson, Ind.

[73] Assignee: Aero Industries, Inc., Indianapolis, Ind.

[21] Appl. No.: 348,064

[22] Filed: Nov. 23, 1994

[51] Int. Cl.$^6$ .................................................. B60P 7/02
[52] U.S. Cl. ........................................... 296/100; 296/105
[58] Field of Search ................................... 296/100, 104, 296/105, 181

[56] References Cited

U.S. PATENT DOCUMENTS

| | | | |
|---|---|---|---|
| 3,298,732 | 1/1967 | Openshaw | 296/100 |
| 3,326,598 | 6/1967 | Kunsch | 296/105 |
| 4,342,480 | 8/1982 | Rose, Jr. | 296/100 |
| 4,711,484 | 12/1987 | Tuerk . | |
| 4,902,064 | 2/1990 | Tuerk et al. . | |
| 5,152,575 | 10/1992 | DeMonte et al. | 296/105 |
| 5,338,084 | 8/1994 | Wardell | 296/105 |

OTHER PUBLICATIONS

Roll–Tite Tarping Systme Sales Brochure, Till–Fab Ltd. (undated).

Primary Examiner—Dean Kramer
Attorney, Agent, or Firm—Laubacher & Laubacher

[57] ABSTRACT

A tarp system for a flatbed trailer is disclosed including front end, intermediate and rear end bow members that are all slidably moveable relative to the flat bed to permit the front and/or rear loading thereof, a cam device serving to displace the front and rear end bow members apart, thereby to tension the tarp cover carried by the bow members. A bump rail extends laterally outwardly from each flatbed side wall beyond an associated guide rail upon which are supported a plurality of carriages that carry the tarp supporting bows, thereby to improve the sealing of the lower side edges of the tarp cover and to protect the guide rails and the carriage from objects below.

21 Claims, 5 Drawing Sheets

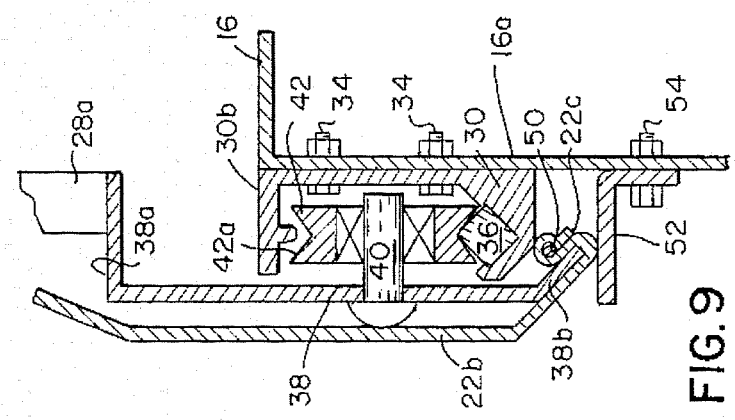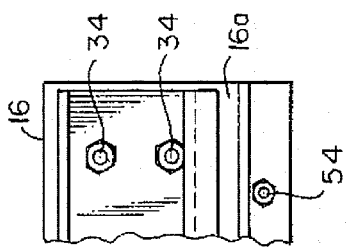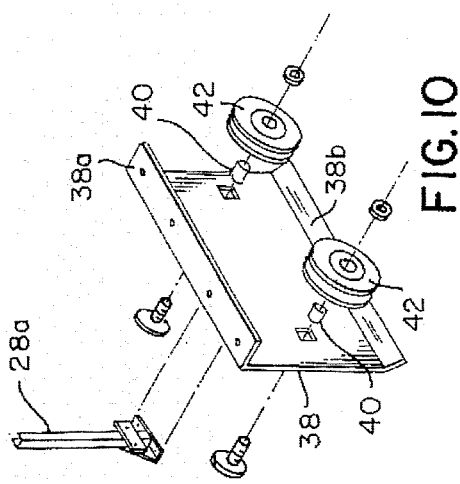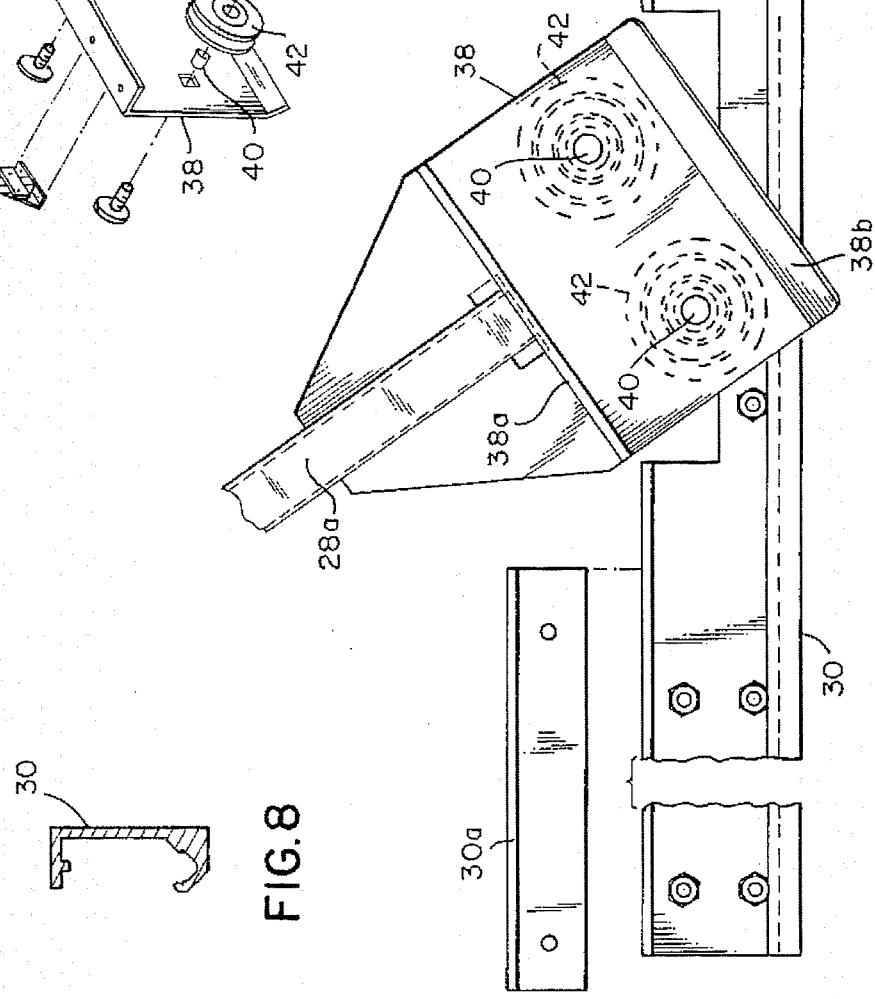

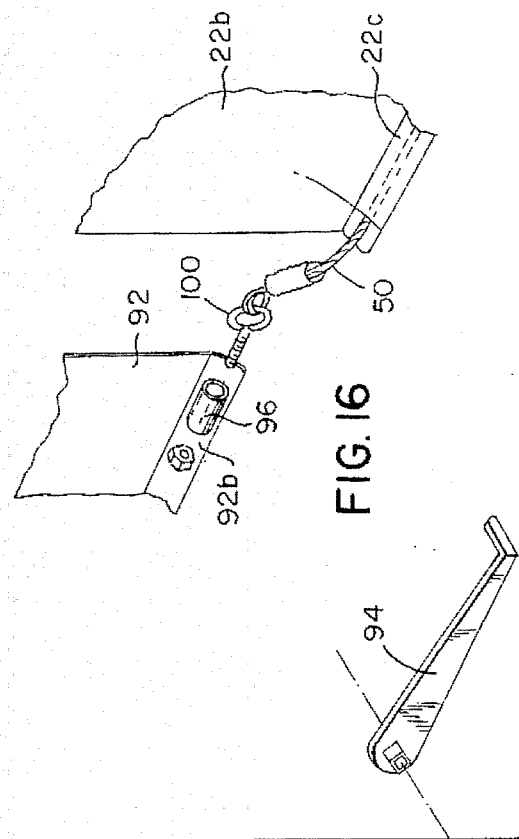
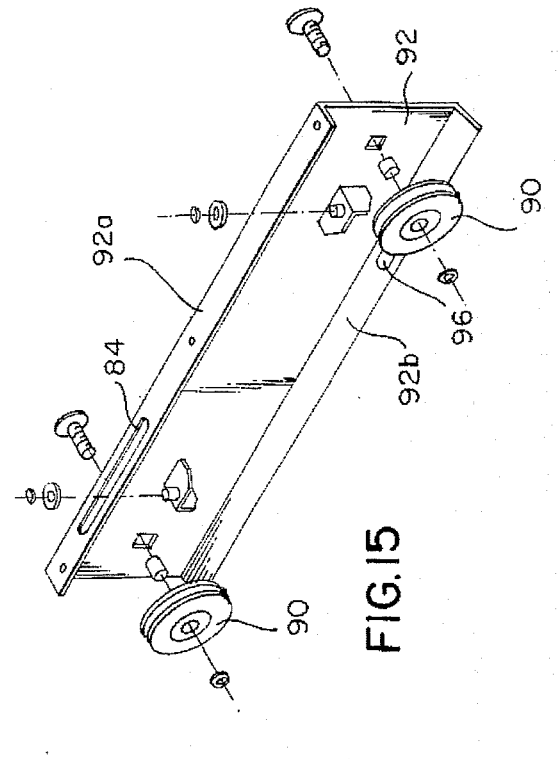
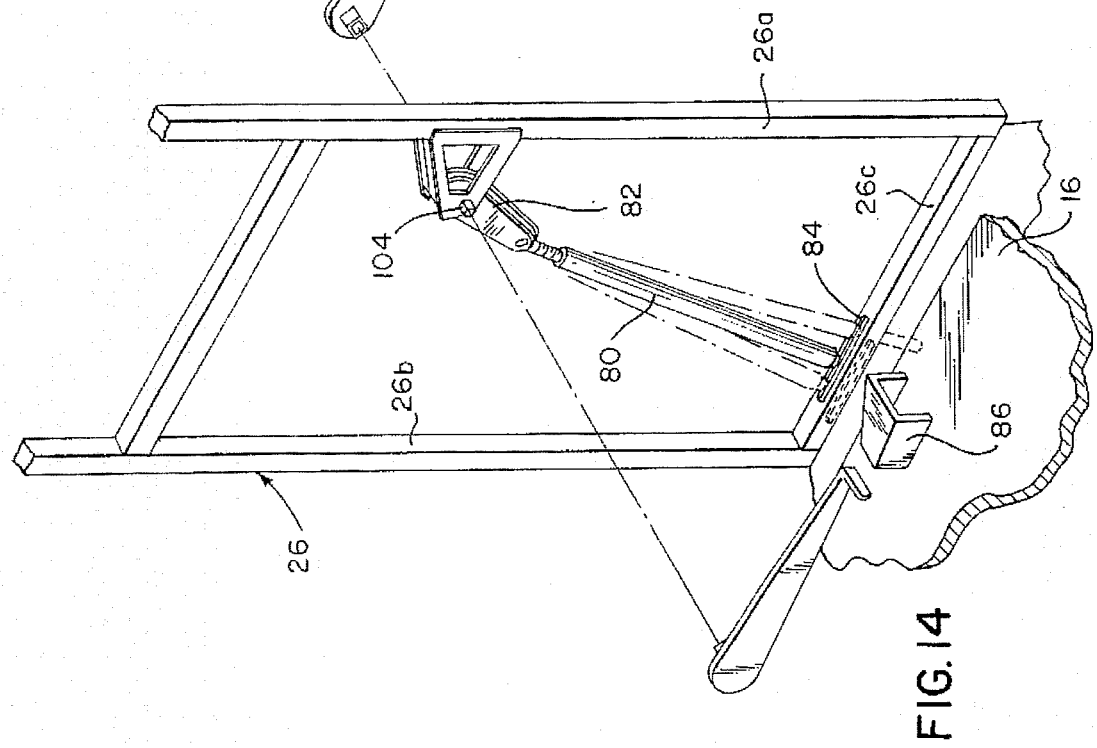

FLATBED TRAILER TARP SYSTEM AFFORDING FRONT AND/OR REAR LOADING

STATEMENT OF THE INVENTION

A tarp system for flat bed trailers includes front end, intermediate and rear end bow means that are all manually slideably moveable by the operator relative to the flatbed, thereby to afford front and/or rear loading of the flatbed. At least one of the locking means for locking the front and rear bows to the flatbed include cam means for automatically longitudinally tensioning the tarp cover.

BRIEF DESCRIPTION OF THE PRIOR ART

In the prior Tuerk U.S. Pat. Nos. 4,711,484 and 4,902,064 (both assigned to the same assignee as the present invention), tarp cover systems for flat bed trailers are disclosed in which the tarp carrying bows are slidably movable forwardly of the flatbed to permit the rear unloading thereof. Similarly, in the ROLL-TITE flat deck tarping system marketed by TILL-FAB Ltd., the entire bow and tarp assembly may be collapsed and slideably displaced forwardly or rearwardly of the flat deck, thereby to afford front and/or rear loading and unloading of the flat bed. A pair of steel posts pivotally connected with the rear of the trailer are pivoted from horizontal positions upwardly toward vertical positions relative to the flatbed, whereupon the operator must manually place the rear carriage and bow assembly adjacent the posts, extend the ratchet straps and hooks from the post to the rear bow and carriage assembly, and lock the system, usually with four ratchets, binders or bolts with wing nuts. These connecting means are costly and require considerable time and effort, and are unattractive in appearance.

The present invention was developed to avoid the above and other drawbacks of the known tarp cover systems.

SUMMARY OF THE INVENTION

Accordingly, a primary object of the present invention is to provide an improved flatbed tarp cover system that is operable for front and/or rear loading, and includes rear and/or front bow locking means that automatically longitudinally tension the tarp cover during the locking of at least one of the end bow assemblies.

According to a more specific object of the invention, improved guide rail and carriage means are provided which support the front end, intermediate and rear end bows for manual sliding displacement forwardly and rearwardly of the flatbed. The front end and rear bow means each comprise a rigid bow assembly that is supported by a carriage having a greater wheel spacing distance than the distance between the wheels of the intermediate bow carriages, thereby to afford improved manual operation without binding. Additional stability of the end bow assemblies is afforded by a non-flexible skin cover layer, such as aluminum.

According to a further object of the invention, improved sealing of the space between the bottom edges of the tarp side walls and the trailer flatbed is afforded, use being made of a bump rail secured to the flatbed and extending laterally outwardly therefrom in spaced relation below the guide rail and the carriages associated therewith.

Another object of the invention is to provide an improved bulkhead assembly that is adapted for mounting on the front of the flatbed trailer, together with improved locking bar catch means for locking the front bow assembly to the bulkhead, and locking rod cam means for locking the rear bow assembly to the flatbed and for simultaneously longitudinally tensioning the tarp cover.

Still another object is to provide improved hold-down means for retaining the lower side edges of the tarp in place, in combination with bump rail means that extend laterally outwardly from the flat bed below both the guide rail and the bottom edge of the associated bow carriage, thereby to afford improved sealing of the bottom side edges of the tarp.

BRIEF DESCRIPTION OF THE DRAWINGS

Other objects and advantages of the invention will become apparent from a study of the following specification, when viewed in the light of the accompanying drawings, in which:

FIG. 7 is a side elevational view of a guide rail and bow carriage arrangement in a partially disassembled condition;

FIG. 8 is a sectional view taken along line 8—8 of FIG. 7;

FIG. 9 is a detailed sectional view of the guide rail and intermediate bow carriage assembly;

FIG. 10 is an exploded view of the intermediate bow carriage of FIGS. 7 and 9;

FIG. 14 is a detailed perspective view of the rear end bow locking and tarp-tensioning cam means;

FIG. 15 is an exploded view of the rear end bow carriage; and

FIG. 16 is a detailed view of the tarp hold-down cable means.

DETAILED DESCRIPTION

Figure 1:
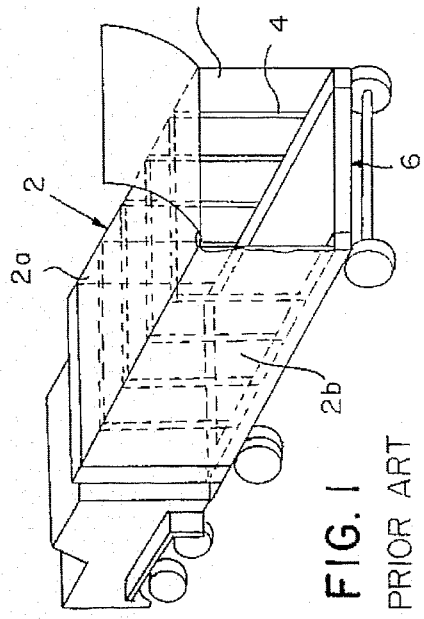
FIGS. 1 and 2 are perspective views of a known rear-end loading flat bed trailer of the prior art.
Figure 2:
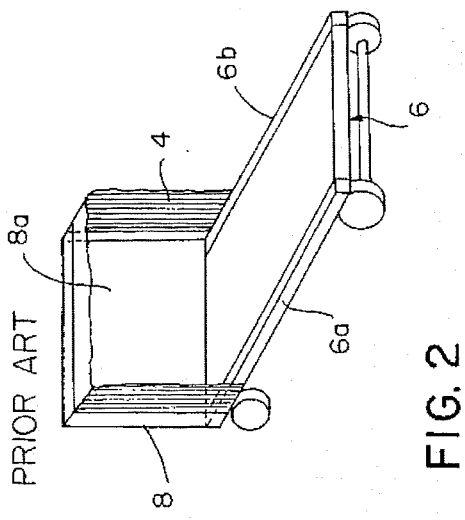

Referring first more particularly to FIGS. 1 and 2, the illustrated prior art tarp covering system of the aforementioned Tuerk patents is of the rear-end loading type in which the tarp cover 2 is supported by inverted U-shaped bows 4 to enclose a cargo supporting space above the flat bed trailer 6. The tarp cover has a horizontal top portion 2a, and a pair of side wall portions 2b and 2c that extend downwardly adjacent the longitudinal side edges 6a and 6b of the flat bed trailer 6. The bows are slidably connected with the flat bed for sliding displacement forwardly of the flat bed to the open condition of FIG. 2 wherein the bows 4 are adjacent the front bulkhead 8 of the flat bed trailer. Thus, as shown in FIG. 2, the flat bed trailer is in a condition for unobstructed rear loading and unloading of the vehicle.

Figure 3:
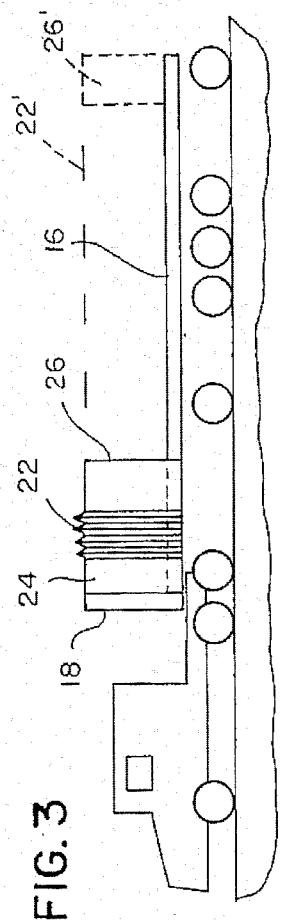
FIGS. 3–5 illustrate diagrammatically the flat bed trailer tarp cover system of the present invention in the front and rear end loading, front end loading conditions, respectively.
Figure 4:
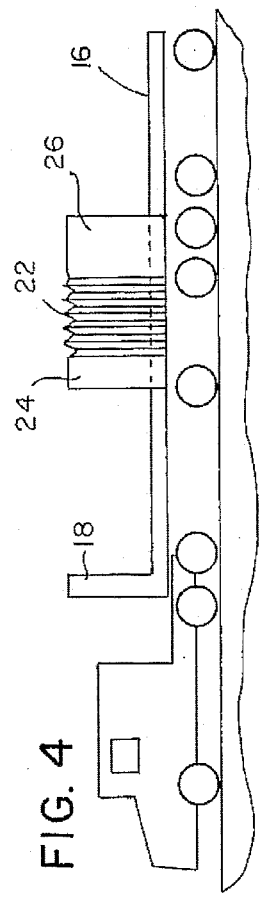
Figure 5:
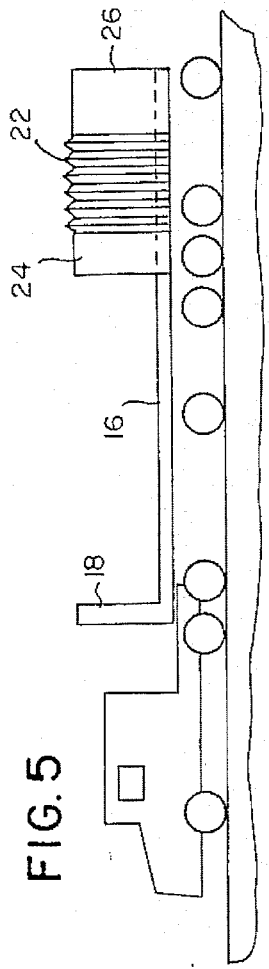

Referring now to FIGS. 3–5, in accordance with the improved tarp covering system of the present invention, the front end and rear end bow means 24 and 26, as well as all of the intermediate bow means 28 arranged therebetween, are connected by carriage and guide rail means for longitudinal sliding movement relative to the trailer flat bed 16. Thus, the bows that carry the tarp 22 are displacable between the rear end loading condition of FIG. 3, the front and rear loading condition of FIG. 4, and the rear end loading condition of FIG. 5, respectively. When the front end bow means 24 is adjacent the fixed bulkhead 18 and the rear end bow means 26 is adjacent the rear end of the flat bed as shown in phantom in FIG. 3, the tarp 22 completely encloses the cargo space defined above the flat bed trailer 16.

Figure 6:
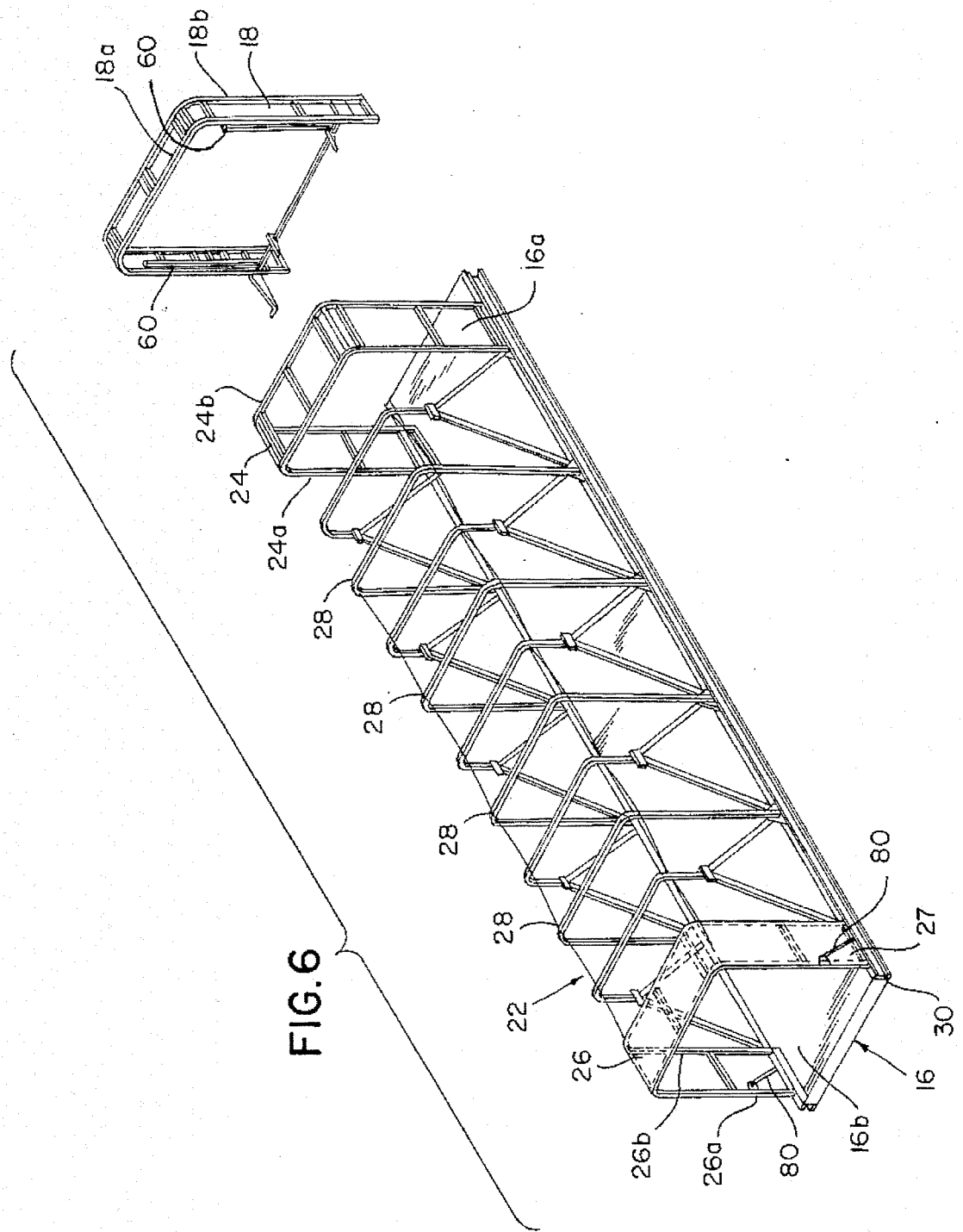
FIG. 6 is a perspective view, with certain parts removed, of the bow and bulk head arrangement of the present invention.

Referring now to FIG. 6, the generally U-shaped front end, intermediate and rear end bow members are slideably connected by associated carriages with longitudinally extending guide rails 30 that are mounted on opposite sides of the trailer flat bed 16. The front bulkhead 18 extends transversely across the front end portion 16a of the trailer and is secured thereto by means of bolts, welding, or the like. As will be described in greater detail below, the front end and rear end bows 24 and 26 are each formed as an assembly of a pair of rigidly connected U-shaped bows 24a, 24b and 26a, and 26b. Similarly, the front bulkhead 18 comprises an assembly formed by a pair of rigidly connected U-shaped bows 18a and 18b, respectively.

Referring now FIGS. 7–10, each guide rail 30 has a generally C-shaped cross sectional configuration and is rigidly bolted to the adjacent side wall of the flat bed trailer 16 as best shown in FIG. 9. The guide rails 30 are formed of extruded aluminum and include an insert bar 36 that is formed of steel and that extends longitudinally the length of the guide rail.

Slideably mounted on the guide rails are a plurality of intermediate carriages 38 associated with the intermediate U-shaped bows 28, respectively. Each carriage 38 carries a pair of spaced parallel shafts 40 upon which are journaled steel wheels or pulleys 42 that ride on the steel support bar inserts 36. Each pulley 42 contains a peripheral groove 42a of a configuration that corresponds with the convex V-shaped upper surface of the steel insert bar 36. The body portion of the carriage 38 is defined by a vertical flat plate having a horizontally bent upper flange 38a, and an angularly inwardly inclined lower flange 38b that extends below the associated guide rail 30. The leg portion 28a of the associated intermediate bow 28 is bolted to the upper flange portion 38a of the carriage. As best shown in FIG. 9, the tarp side wall 22b extends downwardly adjacent the external surface of the carriage 38 and downwardly and inwardly about the lower flange portion 38b. The lower extremity of the tarp has a pocket 22c that receives the longitudinally extending hold-down cable 50 as will be described below. Mounted in spaced relation below the guide rail 30 and the angular portion 38b of the intermediate bow carriage 38 is a bump rail 52 that is bolted by bolts 54 to the side wall 16a of the flat bed 16.

In accordance with an important feature of the invention, the guide rail 30 includes intermediate its ends a removable section 30a that contains the upper wall portion 30b of the guide rail. The length of the removable section 30a is such as to permit removal of the intermediate bow carriage 38—as well as the front and rear carriages, if desired—from the guide rail, thereby facilitating the assembly and disassembly of the apparatus.

Figure 11:
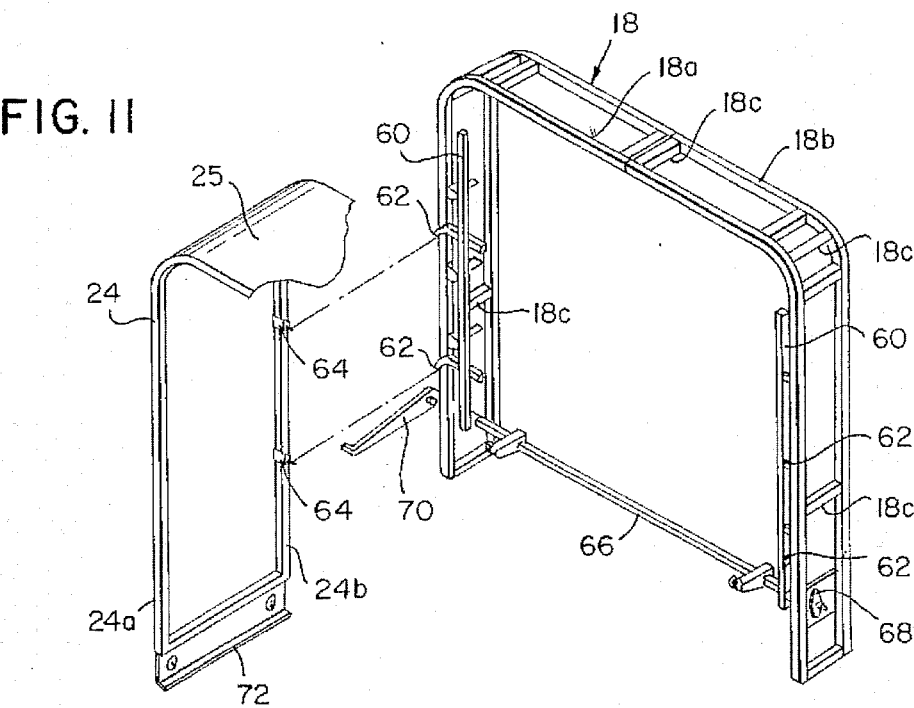
FIG. 11 is a detailed perspective view of the bulkhead and the front end bow assembly.
Figure 12:
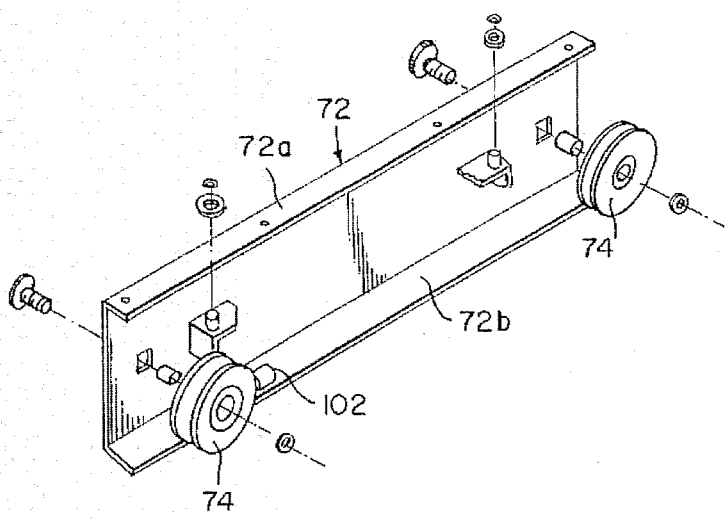
FIG. 12 is an exploded perspective view of the front bow carriage.
Figure 13:
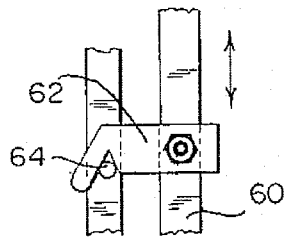
FIG. 13 is a detailed view of the locking bar catch and pin means.

Referring now to FIGS. 11–13, the bulkhead 18 that is secured by bolts or welding to the front end portion 16a of the flat bed 16 includes a pair of U-shaped bows 18a and 18b that are connected by longitudinally extending horizontal cross members 18c. Connected for vertical sliding movement relative to the leg portions of the bulkhead 18 are a pair of vertical locking bars 60 having catch members 62 arranged for locking cooperation with latch pins 64 fixed to the adjacent bow 24b of the front end bow assembly 24. The locking bars 60 are displaced simultaneously vertically by the horizontal connecting shaft 66 that is journaled in fixed bearing 68 and which is manually rotated in the opposite directions by the hand crank 70. The front end carriage 72 is connected to the lower end of the leg portions of the front bow means 24, which carriage is provided with wheels or pulleys 74 that ride on the associated guide rail that is secured to the trailer flat bed. In order to provide stability for the front bow assembly 24, the spacing distance between the wheels 74 is greater than the spacing distance between the wheels 42 of the intermediate bow carriages 38. To connect the front bow assembly 24 with the bulkhead 18, the hand crank 70 is operated to elevate the locking bars 60 which are thereby bars 60, and after the front bow assembly is manually displaced into engagement with the rear bow 18a of the bulkhead, the hand crank 70 is rotated in the opposite direction to lower the locking bars to effect locking engagement between each catch 62 and the locking pin 64, as shown in FIG. 13. The rigid front bow assembly 24 is covered with a thin aluminum skin layer 25, thereby to further impart stability to the front bow assembly.

Referring now to FIGS. 14 and 15, the rear end bow assembly 26, with an aluminum external skin layer 27, is locked to the rear end portions 16b of the flat bed by a pair of locking rods 80 that are connected at their upper ends with the rear most bow member 26a by cam means 82. At their lower ends, the locking bars 80 extend through slots 84 contained in the lowermost transverse member 26c of the leg portion of the rear end bow assembly 26. The length of each locking rod 80 is such as to extend downwardly for engagement to a fixed receptacle 86 which is secured (for example, by welding) with the upper surface of the flat bed 16. The wheels 90 of each rear end carriage 92 ride on the wheel supporting surfaces of the adjacent guide rails 30, the spacing distance between the carriage wheels 90 being greater than the spacing distance between the wheels 42 of the intermediate bow carriages 38, thereby to impart additional stability to the rear end bow assembly 26. The locking rod 80 is operable by cam means 82 upon the application of torque by the hand crank 94 to displace the rear end assembly 26 rearwardly relative to the receptacle 86 and the flat bed 16, thereby to tension the tarp cover 22.

Referring now to FIG. 16, the tarp side walls 22b are provided at their lower extremities with pockets 22c that receive the longitudinally extending hold-down cable 50 that is secured at its rear end with fixed sleeve 96 welded to lower flange portion 92b of carriage 92 by eyelet means 100. Similarly, at its forward end, the hold-down cable 50 is secured to a corresponding sleeve 102 that is secured to the flange portion 72b of the front carriage 72.

OPERATION

In operation, assume that it is desired to fully cover the flat bed 16 of the trailer apparatus of FIG. 4. The operator manually displaces the front end bow assembly 24 into engagement with the bulkhead 18, whereupon the crank arm 70 is operated to elevate the locking bars 60, and then rotated in the opposite direction to effect locking engagement between the latch 62 and the locking pin 64, thereby to lock the front bow assembly to the bulkhead as shown in FIG. 13. The operator then manually slides the rear end bow assembly 26 to the rear end of the flat bed 16, whereupon crank arms 94 are manually rotated to cause the lower end of the locking rod 80 to engage the corresponding receptacle 86 on the flat bed 16, so that further rotation of the crank arm effects a camming action of cam means 82 relative to the distance between the pivot axis 104 and the receptacle 86, thereby to further displace the rear bow assembly toward the rear end of the flat bed and thus tension the tarp cover 22.

While in the accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A tarp system for a flat bed trailer having a longitudinal axis and front and rear ends, comprising:
   (a) a pair of horizontal parallel guide rail means adapted for mounting on the opposite sides of the trailer, respectively;
   (b) a plurality of generally U-shaped inverted front end, intermediate, and rear end bow means initially arranged in transverse longitudinally spaced relation relative to said trailer, each of said bow means having a horizontal upper bridging portion and a pair of downwardly extending leg portions;
   (c) carriage means connecting the lower ends of said bow leg portions for horizontal displacement relative to said guide rail means, respectively;
   (d) first means for releasably connecting the front end bow means with the front end of the trailer;
   (e) second means for releasably connecting the rear end bow means with the rear end of the trailer;
   (f) a tarp cover supported by said bow means for covering and enclosing a given cargo space above the trailer, whereby upon releasing either of said first and second connecting means, said bow means may be slidably displaced relative to the trailer to uncover the associated end of the trailer; and
   (g) cam means operable when said bow means and said tarp are in the flatbed covering condition for displacing said front and rear end bow means apart, thereby to longitudinally tension the tarp cover.

2. A tarp system as defined in claim 1, wherein each of said carriage means includes at least two longitudinally spaced wheels having parallel horizontal axes extending normal to the longitudinal axis of the trailer, said wheels being rotatably supported by said guide rail means.

3. A tarp system as defined in claim 2, wherein each of said guide rail means has a generally C-shaped cross-sectional configuration defining an outwardly facing groove for receiving said wheels.

4. Apparatus as defined in claim 3, wherein each of said wheels contains a peripheral groove having a generally V-shaped configuration;
   and further wherein each of said guide rail grooves has a lower longitudinally extending wheel-supporting rail portion having a convex generally V-shaped configuration corresponding to that of said wheels.

5. Apparatus as defined in claim 4, wherein said wheels and said wheel-supporting rail portion are formed of steel;
   and further wherein the remaining portion of said guide rail means is formed of extruded aluminum.

6. Apparatus as defined in claim 4, wherein said guide rail means include intermediate their ends opposed removable sections each containing the associated upper wall portions of said grooves, thereby to define access openings for the removal and insertion of said wheels in said rail grooves during the disconnection and connection of said carriages to the trailer flat bed.

7. Apparatus as defined in claim 2, wherein each of said carriage means includes a vertical wall having a lower horizontal edge portion that terminates at an elevation lower than the associated guide rail means;
   and further including a pair of horizontal bump rails adapted for connection with the trailer flat bed in parallel spaced relation below said guide rail means, respectively, each of said bump rails extending laterally outwardly from said trailer flat bed in spaced relation below the associated guide rail means and below said lower edge portion of said carriage vertical wall.

8. Apparatus as defined in claim 7, wherein said tarp cover includes side portions that extend downwardly adjacent the outer surfaces of said bow leg portions and laterally inwardly within the space defined between said bump rails and the lower edge portions of the vertical wall portions of the associated carriage means, respectively.

9. Apparatus as defined in claim 8, and further including hold-down cable means connected between the carriage means associated with the said front end and rear end bow means for retaining the lower edges of the tarp sides within the spaces defined between each of said guide rail means and the associated bump rail.

10. Apparatus as defined in claim 2, wherein at least one of said front end and rear end bow means comprises an assembly including a pair of parallel spaced rigidly connected bow members the legs of which are connected with the associated end carriage means, respectively, and further wherein the spacing distance between the wheels of each end carriage means associated with said at least one end bow means is greater than the spacing distance between the wheels of the carriage means associated with the intermediate bow means.

11. Apparatus as defined in claim 10, and further including an aluminum skin layer covering said at least one of said end bow means.

12. Apparatus as defined in claim 10, wherein at least one of said releasable connecting means includes a pair of generally vertical locking rods connected at their upper ends with the legs of one of said end bow members, respectively, said locking rods being adapted for engagement at their lower ends with locking receptacles on the trailer flat bed, respectively.

13. Apparatus as defined in claim 12, and further wherein said cam means are connected between said locking rods and the associated end bow member for displacing said end bow members apart.

14. Apparatus as defined in claim 1, wherein said tarp cover tensioning means is included in at least one of said first and second releasable connecting means.

15. Apparatus as defined in claim 1, wherein at least one of said first and second releasable connecting means includes:
   (1) a bulkhead member adapted for rigid connection with one end of, and extending upwardly from and transversely across, the trailer flat bed; and
   (2) locking bar catch and pin means for releasably connecting said bulkhead member with the adjacent leg portions of the associated end bow means, respectively.

16. Apparatus as defined in claim 15, wherein said locking bar catch and pin means includes a pair of vertical locking bars connected for vertical sliding movement relative to said bulkhead at opposite sides of the flat bed, respectively, each of said locking bars having a plurality of vertically spaced catches arranged for cooperation with corresponding horizontal locking pins on the associated end bow member, respectively.

17. Apparatus as defined in claim 16, and further including operating means for simultaneously displacing said locking bars between locked and released positions relative to said locking pins.

18. A tarp system for a flat bed trailer having a longitudinal axis and front and rear ends, comprising:

(a) a pair of horizontal parallel guide rail means adapted for mounting on the opposite sides of the trailer, respectively;

(b) a plurality of generally U-shaped inverted front end, intermediate, and rear end bow means initially arranged in transverse longitudinally spaced relation relative to said trailer, each of said bow means having a horizontal upper bridging portion and a pair of downwardly extending leg portions;

(c) carriage means connecting the lower ends of said bow leg portions for horizontal displacement relative to said guide rail means, respectively, each of said carriage means including a carriage vertical wall having a lower horizontal edge portion that terminates at an elevation lower than the associated guide rail means;

(d) first means for releasably connecting the front end bow means with the front end of the trailer;

(e) second means for releasably connecting the rear end bow means with the rear end of the trailer;

(f) a tarp cover supported by said bow means for covering and enclosing a given cargo space above the trailer, whereby upon releasing either of said first and second connecting means, said bow means may be slidably displaced relative to the trailer to uncover the associated end of the trailer; and (g) a pair of horizontal bump rails adapted for connection with the trailer flat bed in parallel spaced relation below said pair of guide rail means, respectively, each of said bump rails extending laterally outwardly from said trailer flat bed in spaced relation below the associated guide rail means and below the lower edge portion of the associated carriage vertical wall.

19. A tarp system for a flat bed trailer having a longitudinal axis and front and rear ends, comprising:

(a) a pair of horizontal parallel guide rail means adapted for mounting on the opposite sides of the trailer, respectively;

(b) a plurality of generally U-shaped inverted front end, intermediate, and rear end bow means initially arranged in transverse longitudinally spaced relation relative to said trailer, each of said bow means having a horizontal upper bridging portion and a pair of downwardly extending leg portions;

(c) a plurality of carriage means connecting the lower ends of said bow leg portions for horizontal displacement relative to said guide rail means, respectively, each of said carriage means including at least two longitudinally spaced wheels having parallel horizontal axis extending normal to the longitudinal axis of the trailer, said wheels being rotatably supported by said guide rail means;

(d) first means for releasably connecting the front end bow means with the front end of the trailer;

(e) second means for releasably connecting the rear end bow means with the rear end of the trailer;

(f) a tarp cover supported by said bow means for covering and enclosing a given cargo space above the trailer, whereby upon releasing either of said first and second connecting means, said bow means may be slidably displaced relative to the trailer to uncover the associated end of the trailer; and (g) at least one of said front end and rear end bow means comprising an assembly including a pair of parallel spaced rigidly connected bows the legs of which are connected with the associated end carriage means, respectively, and further wherein the spacing distance between the wheels of each end carriage means associated with said at least one end bow means is greater than the spacing distance between the wheels of the carriage means associated with the intermediate bow means.

20. A tarp system for a flat bed trailer having a longitudinal axis and front and rear ends, comprising:

(a) a pair of horizontal parallel guide rail means adapted for mounting on the opposite sides of the trailer, respectively;

(b) a plurality of generally U-shaped inverted front end, intermediate, and rear end bow means initially arranged in transverse longitudinally spaced relation relative to said trailer, each of said bow means having a horizontal upper bridging portion and a pair of downwardly extending leg portions;

(c) carriage means connecting the lower ends of said bow leg portions for horizontal displacement relative to said guide rail means, respectively;

(d) first means for releasably connecting the front end bow means with the front end of the trailer;

(e) second means for releasably connecting the rear end bow means with the rear end of the trailer; and (f) a tarp cover supported by said bow means for covering and enclosing a given cargo space above the trailer, whereby upon releasing either of said first and second connecting means, said bow means may be slidably displaced relative to the trailer to uncover the associated end of the trailer;

(g) at least one of said first and second releasable connecting means including:

(1) a bulkhead member adapted for rigid connection with one end of, and extending upwardly from and transversely across, the trailer flat bed; and (2) locking bar catch and pin means for releasably connecting said bulkhead member with the adjacent leg portions of the associated end bow means, respectively.

21. A tarp system for a flat bed trailer having a longitudinal axis and front and rear ends, comprising:

(a) a pair of horizontal parallel guide rail means adapted for mounting on the opposite sides of the trailer, respectively;

(b) a plurality of generally U-shaped inverted front end, intermediate, and rear end bow means initially arranged in transverse longitudinally spaced relation relative to said trailer, each of said bow means having a horizontal upper bridging portion and a pair of downwardly extending leg portions;

(c) carriage means connecting the lower ends of said bow leg portions for horizontal displacement relative to said guide rail means, respectively;

(d) first means for releasably connecting the front end bow means with the front end of the trailer;

(e) second means for releasably connecting the rear end bow means with the rear end of the trailer; and (f) a tarp cover supported by said bow means for covering and enclosing a given cargo space above the trailer, whereby upon releasing either of said first and second connecting means, said bow means may be slidably displaced relative to the trailer to uncover the associated end of the trailer; and (g) at least one of said releasable connecting means including a pair of generally vertical locking rods connected at their upper ends with the legs of one of said end bow means, respectively, said locking rods being adapted for engagement at their lower ends with locking receptacles on the trailer flat bed, respectively.

* * * * *